United States Patent
Ogen (10) Patent No.: US 9,958,077 B2
(45) Date of Patent: May 1, 2018

(54) FLUID VALVE

(71) Applicant: A.R.I. FLOW CONTROL ACCESSORIES LTD., D.N. Ramat Hagolan (IL)

(72) Inventor: Itzhak Ogen, Kiryat Tivon (IL)

(73) Assignee: A.R.I. FLOW CONTROL ACCESSORIES LTD., D.N. Ramat Hagolan (IL)

( * ) Notice: Subject to any disclaimer, the term of this patent is extended or adjusted under 35 U.S.C. 154(b) by 41 days.

(21) Appl. No.: 14/769,665

(22) PCT Filed: Mar. 12, 2014

(86) PCT No.: PCT/IL2014/050253
§ 371 (c)(1),
(2) Date: Aug. 21, 2015

(87) PCT Pub. No.: WO2014/141254
PCT Pub. Date: Sep. 18, 2014

(65) Prior Publication Data
US 2016/0003368 A1 Jan. 7, 2016

Related U.S. Application Data

(60) Provisional application No. 61/779,895, filed on Mar. 13, 2013.

(51) Int. Cl.
*F16K 24/04* (2006.01)
(52) U.S. Cl.
CPC .................. *F16K 24/044* (2013.01)
(58) Field of Classification Search
CPC ................. F16K 24/042; F16K 24/044; B60K 15/03519
(Continued)

(56) References Cited

U.S. PATENT DOCUMENTS 2,179,750 A 11/1939 McCracken
4,770,201 A 9/1988 Zakai
(Continued)

FOREIGN PATENT DOCUMENTS

CN 2324352 6/1999
CN 102007013 4/2011
(Continued)

OTHER PUBLICATIONS

International Search Report dated Nov. 6, 2014, received in PCT/IL2014/050253.

*Primary Examiner* — Reinaldo Sanchez-Medina
(74) *Attorney, Agent, or Firm* — Dorsey & Whitney LLP (57) ABSTRACT

A gas purge valve (20) comprising a housing (22) configured with float chamber (40) extending between a fluid inlet port (36) and a fluid outlet port (38), the float chamber accommodating a float-activated valve assembly (50) axially displaceable within the float chamber. The valve assembly comprising at least a kinetic sealing component (54) being axially displaceable within the housing between at least a closed position sealingly engaging a sealing seat (48) of the fluid outlet port, and an open position in which it is disengaged from the sealing seat. The fluid inlet port is in flow communication with the float chamber through a fluid inlet path configured with a fluid flow regulator (100) configured with a fluid discharge flow path (102). The arrangement is such that the minimal diameter of the fluid discharge flow path is greater than the diameter of at least a lower portion of the valve assembly.

14 Claims, 8 Drawing Sheets

(58) Field of Classification Search
USPC .................................. 137/198, 199, 202, 203
See application file for complete search history.

(56) References Cited

U.S. PATENT DOCUMENTS

| | | | | |
|---|---|---|---|---|
| 4,886,089 | A | * | 12/1989 | Gabrlik ............ B60K 15/03519 |
| | | | | 137/202 |
| 5,183,087 | A | | 2/1993 | Aubel et al. |
| 6,145,533 | A | * | 11/2000 | Perkins ................ F16K 24/048 |
| | | | | 137/202 |
| 8,826,947 | B2 | | 9/2014 | Hirose et al. |
| 2001/0011538 | A1 | * | 8/2001 | Crary ................... B60K 15/035 |
| | | | | 123/509 |
| 2003/0189110 | A1 | | 10/2003 | Kurihara et al. |
| 2005/0133089 | A1 | | 6/2005 | Takahashi et al. |
| 2007/0000542 | A1 | * | 1/2007 | Johansen .............. F16K 24/044 |
| | | | | 137/202 |
| 2008/0142087 | A1 | * | 6/2008 | Muto ...................... F16K 17/36 |
| | | | | 137/43 |
| 2010/0108156 | A1 | * | 5/2010 | Katzman ............... F16K 24/044 |
| | | | | 137/202 |

FOREIGN PATENT DOCUMENTS

| | | |
|---|---|---|
| GB | 319159 | 9/1929 |
| JP | H09166234 | 6/1997 |

* cited by examiner

FLUID VALVE

TECHNOLOGICAL FIELD

The presently disclosed subject matter is in the field of fluid flow valves and more particularly is concerned with gas purge valves.

BACKGROUND ART

References considered to be relevant as background to the presently disclosed subject matter are listed below:
U.S. Pat. No. 4,770,201
US Patent Application Publication No. 2010/0108156
Acknowledgement of the above references herein is not to be inferred as meaning that these are in any way relevant to the patentability of the presently disclosed subject matter.

BACKGROUND

Myriad valves are known in the art, configured for governing fluid flow through fluid systems.

For example, U.S. Pat. No. 4,770,201 discloses a fluid flow valve such as a faucet or air-purge valve comprising a housing having defined therein a fluid through-flow aperture with a valve seating formed in the housing and bounding said aperture. A flexible closure membrane is secured at one end to the housing and is adapted to be biased, under fluid pressure in the housing, against the valve seating so as to seal the aperture. Membrane displacing means are secured to an opposite end of the membrane so that displacement of the displacing means in a first sense progressively detaches successive transverse portions of the membrane from the seating so as to open the aperture while displacement of the displacing means in an opposite sense allows for the membrane to become sealingly biased against the seating.

US Patent Application Publication No. 2010/0108156 by the same applicant as the present application Discloses is a gas purge valve that includes a housing formed with a fluid inlet and a fluid outlet. The fluid outlet is bounded by a kinetic valve seating, and a sealing assembly, which includes a float member coaxially displaceable within the housing, and a sealing cap coupled to said float member. The sealing cap is axially displaceable with respect to the float member between a first position in which it conjoins the float, and a second position in which it departs from the float. The sealing cap is formed at an outside face thereof with a kinetic seal fitted for sealing engagement of the kinetic valve seating, and an automatic valve aperture formed in the sealing cap and bounded by an automatic valve seating. An automatic sealing member articulated is at an upper end of the float member for sealing engagement of the automatic valve seating.

GENERAL DESCRIPTION

According to the presently disclosed subject matter there is a gas purge valve comprising a housing configured with float chamber extending between a fluid inlet port and a fluid outlet port, said float chamber accommodating a float-activated valve assembly axially displaceable within the float chamber, said valve assembly comprising at least a kinetic sealing component being axially displaceable within the housing between at least a closed position sealingly engaging a sealing seat of the fluid outlet port, and an open position in which it is disengaged from said sealing seat; wherein the fluid inlet port is in flow communication with the float chamber through a fluid inlet path configured with a fluid flow regulator configured with a fluid discharge flow path; the arrangement is such that the minimal diameter of the fluid discharge flow path is greater than the diameter of at least a lower portion of the valve assembly.

The fluid flow regulator disposed within the fluid inlet path is configured for controlling premature closure performance of the valve, namely to eliminate or substantially reduce shock waves to a fluid line or system equipped with one or more flow valve according to the disclosure, caused by rapid displacement of the float member and its impacting against the sealing seat of the housing.

The configuration of the fluid discharge flow path being of greater diameter than the diameter of at least a lower portion of the valve assembly, results in controlling the pressure differential ΔP required for displacing the valve assembly into its closed position, wherein ΔP is the difference between atmospheric pressure $P_{atm}$ and the pressure within the line $P_{line}[\Delta P = P_{atm} - P_{line}]$.

The provision of the fluid flow regulator does not result in slowing the displacement of the valve assembly into its closed position, but rather it acts to control and postpone spontaneous displacement of the valve assembly until sufficient pressure differential ΔP builds up, namely to govern the premature closing pressure causing the valve assembly to displace into its closed position.

In practice, the fluid flow regulator generates a 'flow shading', namely diverts the fluid flow and causes a flow obstacle so as to govern said premature closing pressure. The diverted flow will also not strike directly upon a bottom face of the valve assembly.

The fluid flow regulator is configured with flow openings constituting the fluid discharge flow path, said flow openings having a minimal diameter $D_{min}$ and a maximal diameter $D_{max}$, wherein $D_{max} \gg D_{min}$ thereby giving rise to a significant flow-through section. The arrangement is further such that $D_{min} > D_{float}$, wherein $D_{float}$ is the diameter of at least the lower portion of the valve assembly.

According to one particular embodiment of the disclosure, the valve assembly comprises a single float sealing unit, acting as a kinetic discharge valve, and according to another embodiment, the valve assembly is a combined-type valve assembly configured with a kinetic component and an automatic component.

The term kinetic component (at times also referred to as an gas/vacuum component) as used herein in the specification and claims denotes a component of the valve designed to discharge or admit large volumes of gas during the filling or draining of a pipeline or piping system. This valve will open to relieve negative pressures whenever water column separation occurs.

The term automatic component (at times also referred to as an automatic/gas release component) as used herein in the specification and claims denotes a component of the valve designed to automatically release to the atmosphere small pockets of gas as they accumulate at local high points along a pipeline when the pipeline or piping system is full and operating under pressure.

A combined-type valve assembly operates such that while under pressure, only the automatic component operates, while the kinetic component remains sealed.

The kinetic component comprises an automatic float member axially displaceable within the float chamber and comprising a sealing member configured for sealing engagement with a sealing seat of the outlet port when the float member is urged into a sealing/closed position thereof.

According to a particular example the kinetic float member is configured at a top portion thereof with a sealing ring configured for sealing engagement with a corresponding shoulder constituting the sealing seat of the outlet port.

Any one or more of the following features, designs and configurations can be implemented with the valve subject of the presently disclosed subject matter, in single form or in combinations thereof:

- A bottom face of the fluid flow regulator, facing the inlet port of the housing, can be configured with a hydrodynamic shape. For example, the bottom face can be convex, domed shaped;
- The fluid flow regulator can be configured for articulation within the housing by screw engagement, snap-fitting, a snap-retention ring, and the like;
- The fluid flow regulator can be axially adjustable within the fluid inlet path so as to control premature closure performance of the valve;
- The fluid flow regulator can be configured with one or more apertures for increasing fluid flow section area through the fluid flow regulator. However, wherein the diameter $D_{apert}$ of the one or more apertures is significantly smaller than the minimal diameter $D_{min}$ of the fluid discharge flow path. Respectively, the cross-section area of the one or more apertures is significantly smaller than the fluid discharge flow path;
- According to a configuration the maximal diameter $D_{max}$ is substantially similar to a nominal diameter $D_{nom}$ of the valve, thereby increasing effective flow cross section area of the fluid discharge flow path;
- According to one particular example $D_{min}$ is in the range of $0.9 \div 0.98$ $D_{nom}$, and more particularly $D_{min} \cong 0.94$ $D_{nom}$;
- The fluid flow regulator is configured for operating at different range values, depending on the nominal size of the valve. For example, for valves having a nominal diameter in the range of about $1" \div 4"$, the pressure differential $\Delta P$ is in the range of about $4 \div 7$ meters (water column), and for valves having a nominal diameter greater than about $4"$, the pressure differential $\Delta P$ is in the range of about $2 \div 4$ meters (water column);
- The valve assembly can be configured with one or more drag increasing arrangements for increasing biasing of the valve assembly during its displacement into the closed position. This results in improved spontaneous displacement of the valve assembly into the closed position, and further eliminates or substantially reduces the likelihood of so-called drowning of the valve assembly under strong fluid flow current overtaking the valve assembly and acting in an opposite sense, i.e. in direction to displace it into its open position;
- According to some configurations, the lower portion of the one or more drag increasing arrangements can be winglets and/or cavities formed at sidewalls and/or at a bottom face of the valve assembly;
- The flow openings of the fluid flow regulator can extend along a segmented annular path having an inner diameter $D_{min}$ and an outer diameter $D_{max}$;
- The fluid flow regulator can be configured with reinforcements, such as ribs, for rigidifying the structure of the fluid flow regulator, so it can withstand impacts also when a heavy valve assembly impacts thereon upon displacement into the open position;
- The fluid flow regulator can be configured with a projection configured for engaging within a corresponding opening formed at a bottom face of the valve member, for directing axial displacement thereof;
- The diameter of the float member (constituting the kinetic component) substantially corresponds with the nominal diameter of the valve;
- The float member can be a single, uniform body or be composed of two or more body elements articulated to one another;
- Where the float member is composed of two (or more) body elements articulated to one another, the diameter $D_{float}$ of a first (lowermost) body element is greater than the diameter $D_{float2}$ of a second body element articulated over the first body element, and wherein $D_{float}$ is substantially similar to the nominal diameter $D_{nom}$ of the valve;
- According to a particular ratio, $D_{float} \cong 0.97$ $D_{float2}$;
- Balancing the buoyant forces of the float member can be by adding weight to the float or by configuring closed or open voids therein;
- The valve assembly can comprise an automatic component articulately configured over a top portion of the kinetic component;
- The valve assembly can comprise an automatic component articulately configured within a top portion of the kinetic component;
- The fluid flow regulator can be configured with one or more upwardly projecting studs for supporting the float member when it comes to rest thereover, at its fully open position. According to a particular arrangement, the one or more upwardly projecting studs are disposed in conjunction with corresponding receiving locations configured at a bottom surface of the float member;
- One of the fluid flow regulator and an inside face of the housing can be configured with one or more lateral projections, and the other of the fluid flow regulator and an inside face of the housing can be configured with one or more lateral recesses corresponding with the location and geometry of the one or more lateral projections, for true positioning of the fluid flow regulator within the housing, i.e. at a particular orientation relative thereto and to the float member, respectively;
- The fluid flow regulator can be configured with a housing engaging portion having a diameter $D_{max}$ and flow openings constituting the fluid discharge flow path, said flow openings having a minimal diameter $D_{min}$, wherein the housing engaging portion is axially displaced with respect to the flow openings. According to a particular configuration the housing engaging portion extends behind the flow openings, with a plurality of legs supporting a dome shaped disc portion;
- The automatic component is a so-called 'peel away' valve component.
- The automatic component comprises an automatic fluid outlet configured with a substantially elongated slit-like outlet aperture; a valve seating bounding said automatic fluid outlet aperture; an automatic float member located in said housing above or within the kinetic float and axially displaceable within said housing and respective to the kinetic float member; an elongated flexible closure membrane strip anchored at least at one end thereof to an end of said automatic float member adjacent said automatic fluid outlet and at a portion thereof offset with respect to said outlet;
- The arrangement is such that buoyancy forces acting on said automatic float member tend to press said membrane strip into sealing engagement with said automatic outlet aperture whilst gravity forces acting on said automatic float member tend to displace said float member away from said outlet so as to progressively detach said strip from sealing engagement with said automatic outlet aperture;

The automatic component can ride over the kinetic float member and be axially displaceable with respect to one another;

The automatic component can be configured within a receptacle configured within the kinetic float member, and be axially displaceable with respect to one another, typically the automatic component is configured within a top portion of the kinetic component;

The valve can be a so-called 'nominal valve', i.e. wherein an outlet diameter of the valve is substantially similar to an inlet diameter thereof. This configuration can offer several benefits such as minimal flow-loss, a housing manufactured as a mono-block, single piece, etc.;

The valve can be configured at a top portion of the housing, above the fluid outlet port, with a drain port configured for draining residual liquids that could otherwise accumulate at an outlet chamber (typically extending to an outlet pipe or an outlet flow diverter);

The float chamber of the housing can be configured with a gage port, or a preparation for a gage port, for articulating thereto a pressure gage;

An external surface of the housing can be configured with handgrip improving configurations, such as ribs and the like, for fastening the housing over a coupler;

The housing can be configured, at an inlet side thereof, with a flanged portion for coupling to a corresponding coupler.

According to a modification of the disclosure, the valve can be easily converted from a combined-type valve into a single-type valve, according to one of the following options:
a) The automatic component can be removed from the housing, whereby the top opening is sealed by a fixed plug. By doing so the valve now acts as a kinetic valve only;
b) The kinetic component can be biased into its uppermost position (e.g. by a biasing spring, an adapter ring/plunger, etc.), whereby the valve now acts only as an automatic valve.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Attention is first directed to FIGS. 1 to 5 of the drawings, illustrating a valve according to a first embodiment of the presently disclosed subject matter, the valve generally designated 20.

The valve comprises an elongate cylindrical housing 22 configured at a bottom end thereof with a flanged base fitted with a plurality of openings 26 for securing the valve to a fluid line (not shown). Fitted at a top end of the housing 22 there is an extension tube 33, serving for coupling thereto a liquid handling device such as a diverter pipe (e.g. as seen for example in the example of FIGS. 6 to 8).

The housing 22 is configured with a fluid inlet port 36 at a bottom portion thereof, and a fluid outlet port 38 at an upper portion thereof, with a float chamber 40 extending therebetween. The float chamber is configured with several longitudinally extending ribs 44 (four in the present example), serving as float guides to ensure correct insertion and smooth linear displacement of a float member within the housing, namely to prevent it from rotating or tilting within the float chamber 40. At a top portion of the housing 22 there is an annular valve sealing seat 48, serving also for restricting axial displacement of the float member 54 at its uppermost, sealed position, as will be explained hereinafter.

Axially displaceable within the float chamber 40 there is a float-activated valve assembly generally designated 50, which as will be explained hereinafter in greater detail, said valve assembly 50 is a combined-type valve assembly configured with a kinetic component in the form of kinetic float member 54, and an automatic component designated 58.

The float member 54 is fitted at a top portion thereof with a sealing arrangement in the form of ring 60, configured for sealing engagement with the annular valve sealing seat 48. However, it is appreciated that other sealing solutions are possible too such as providing a sealing ring at the sealing seat 48, etc.

Figure 2A:
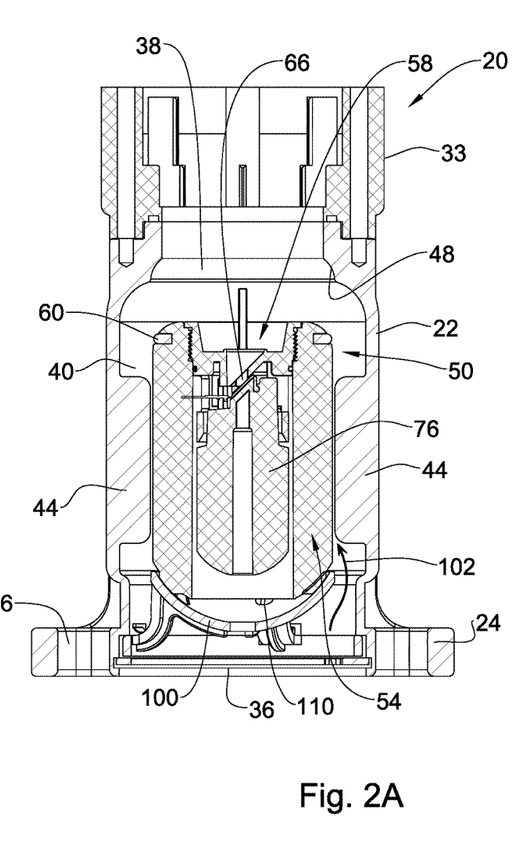
FIG. 2A is a longitudinal section of the valve of FIG. 1, taken along line B-B in FIG. 1B, the valve at a fully open position thereof.
Figure 2B:
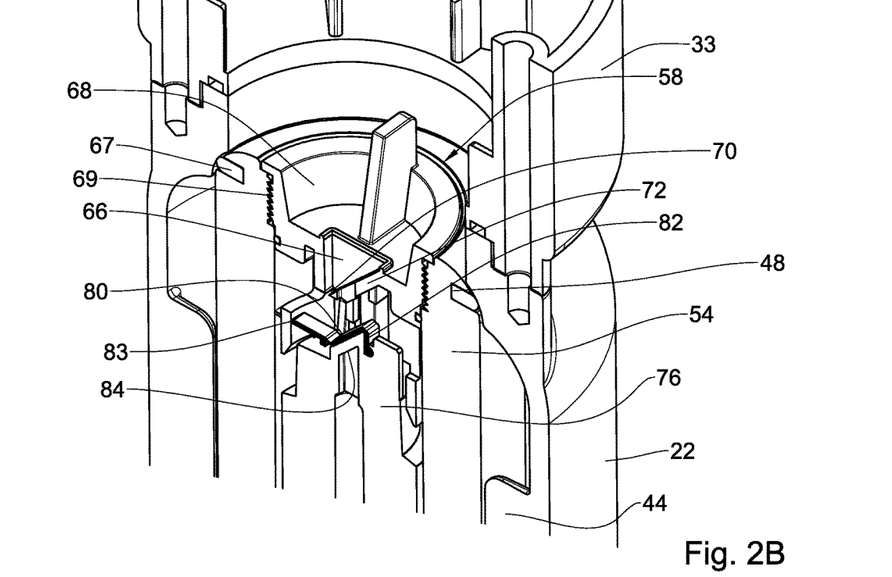
FIG. 2B is an enlargement, at perspective view, of the portion marked III in FIG. 4.
Figure 2C:
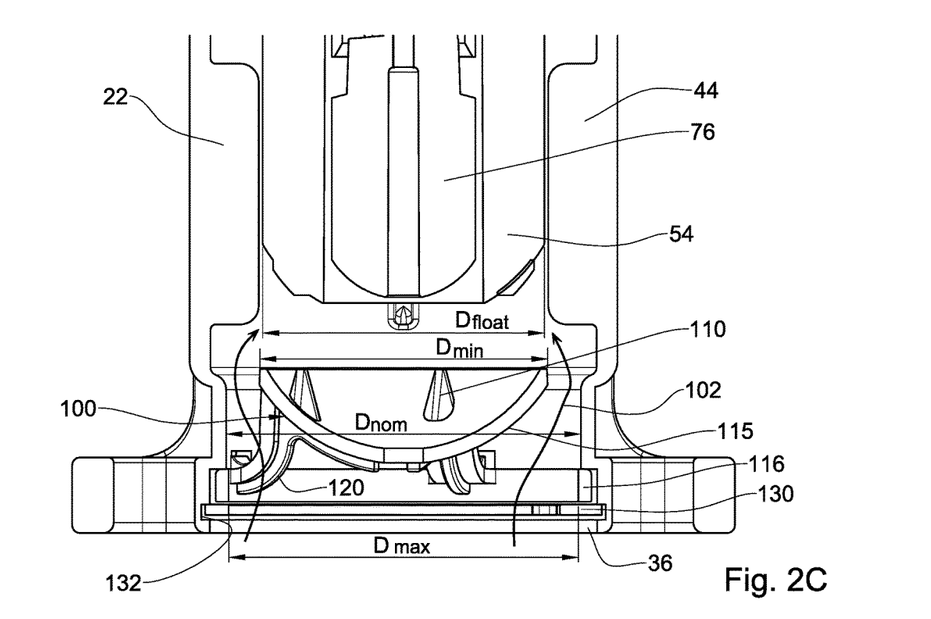
FIG. 2C is an enlargement of the portion marked IV in FIG. 4.

As can best be seen in FIG. 2B, the automatic component 58 is fully received within the kinetic float member 54 and comprises an automatic fluid outlet 66 extending through a plug 68 screw-coupled at 69 to a top portion of the kinetic float member 54, at a sealed fashion by virtue of a sealing O-ring 67. The automatic fluid outlet 66 is configured with a substantially elongated slit-like outlet aperture 70 with a valve seating 72 bounding said automatic fluid outlet aperture 70. An automatic float member 76 is located within the kinetic float member 54, and is axially displaceable therewithin. An elongated flexible closure membrane strip 80 is anchored at both ends thereof 82 and 83 to a top portion of said automatic float member 76 adjacent said automatic fluid outlet 70 and at a portion thereof offset with respect to said outlet, i.e. above an inclined support surface 84.

It is appreciated that the plug 68 (screw-coupled at 69 to a top portion of the kinetic float member 54) in fact gives rise to a small volume sub-chamber, sealed within the kinetic float member, required for operation of the automatic valve component.

It is however appreciated that according to another configuration (not shown), the elongated flexible closure membrane strip 80 can be secured only at one end thereof to the said automatic float member 76.

As can be seen in the figures, the fluid inlet port 36 is in flow communication with the float chamber 40 through a fluid inlet path 90 (FIGS. 4 and 5), configured with a fluid flow regulator 100 configured with a fluid discharge flow path 102 extending through apertures 104, the arrangement is such that the minimal diameter $D_{min}$ of the fluid discharge flow path 102 (i.e. the minimal diameter of the apertures 104) is greater than the diameter $D_{float}$ of at least a lower portion of the kinetic float assembly 54.

As can be seen in the figures, the fluid inlet port 36 is in flow communication with the float chamber 40 through a fluid inlet path 90 (FIGS. 4 and 5), configured with a fluid flow regulator 100 configured with a fluid discharge flow path 102 extending through apertures 104, the arrangement is such that the minimal diameter $D_{min}$ of the fluid discharge flow path 102 (i.e. the minimal diameter of the apertures 104) is greater than the diameter $D_{float}$ of at least a lower portion of the kinetic float assembly 54.

The through apertures 104 of the fluid flow regulator 100 constitute the fluid discharge flow path 102, said flow openings 104 having a minimal diameter $D_{min}$ and a maximal diameter $D_{max}$, wherein $D_{max} >> D_{min}$ thereby giving rise to a significant flow-through section. The arrangement is further such that $D_{min} > D_{float}$, wherein $D_{float}$ is the diameter of at least the lower portion of the valve assembly.

According to the particular configuration the maximal diameter $D_{max}$ is substantially similar to a nominal diameter $D_{nom}$ of the valve, thereby increasing effective flow cross section area of the fluid discharge flow path.

According to one particular example $D_{min}$ is in the range of $0.9 \div 0.98\ D_{nom}$, and more particularly $D_{min} \cong 0.94\ D_{nom}$.

The fluid flow regulator 100 is configured with a housing engaging ring 116 having an inner diameter $D_{max}$ and said flow apertures 104 extend between the ring 116 and the minimal diameter, said flow apertures 104 having a minimal diameter $D_{min}$, wherein the housing engaging portion 116 is axially displaced below the flow apertures. The housing engaging ring 116 extends behind the flow openings, with a plurality of legs 120 supporting the inverted (convex) dome-shaped disc portion 115. The legs 120 and the dome-shaped disc portion 115 are reinforced by support ribs 122, for rigidifying the structure of the fluid flow regulator, so it can withstand impacts also when a heavy valve assembly impacts thereon upon displacement into the open position.

Figure 3A:
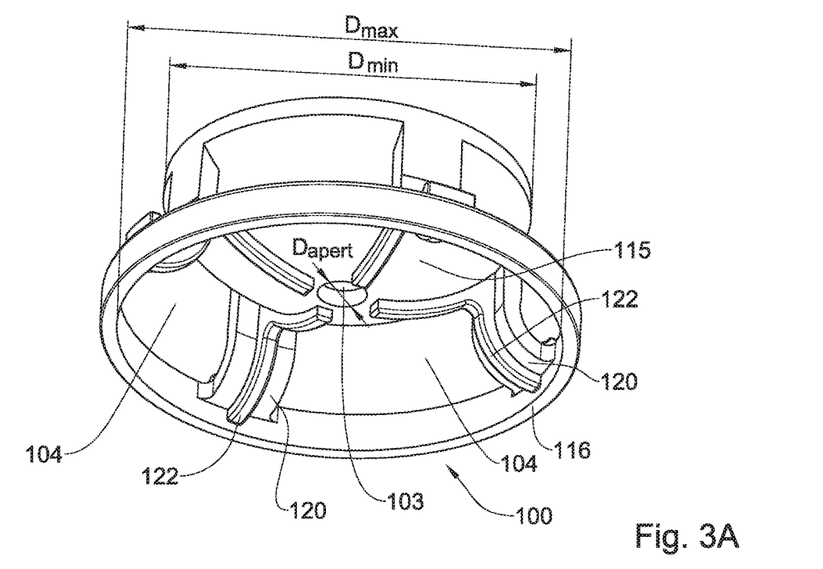
FIG. 3A is a bottom perspective view of a fluid flow regulator for use in conjunction with a valve according to the present disclosure.
Figure 3B:
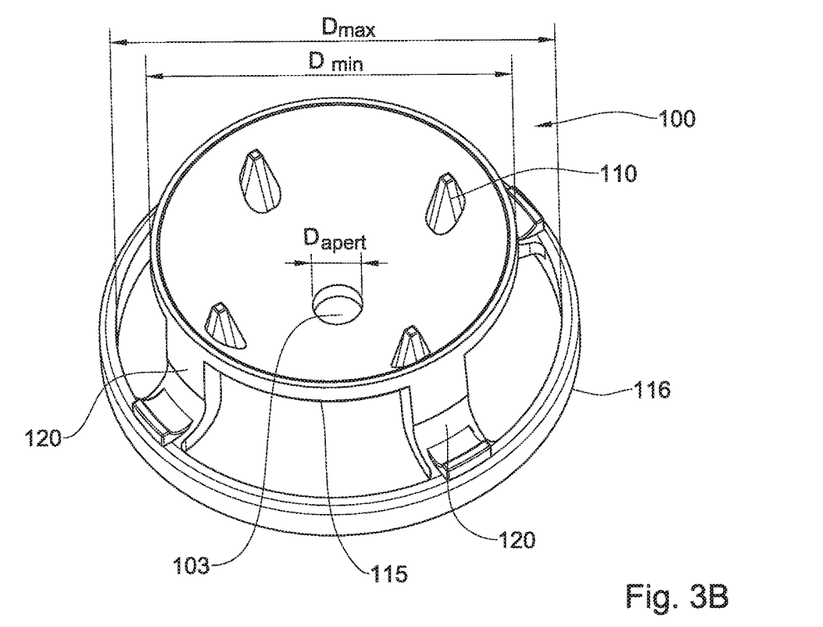
FIG. 3B is a top perspective view of FIG. 3A.

As seen in FIGS. 3A and 3B, the fluid flow regulator 100 is configured with a plurality of upwardly projecting studs 110 for supporting the float member 54 when it comes to rest thereover, at its fully open position (FIG. 2A). The upwardly projecting studs 110 are disposed in conjunction with corresponding receiving locations configured at a bottom surface of the float member.

The fluid flow regulator is configured for operating at different range values, depending on the nominal size of the valve. For example, for valves having a nominal diameter in the range of about 1"÷4", the pressure differential ΔP is in the range of about 4÷7 meters water column, and for valves having a nominal diameter greater than about 4", the pressure differential ΔP is in the range of about 2÷4 meters water column.

In the particular example, the fluid flow regulator 100 is secured at the inlet of the housing 22 by a spring-type retention ring 130, snappingly secured within an annular groove 132 of the housing 22. According to other configurations the fluid flow regulator 100 can be axially displaced within the inlet port of the housing, so as to control different flow parameters, namely for controlling a 'flow shading' generated by the fluid flow regulator 100, namely diverting the fluid flow and causing a flow obstacle so as to govern said premature closing pressure.

The fluid flow regulator 100 disposed within the fluid inlet path 36 is configured for controlling premature closure performance of the valve, namely to eliminate or substantially reduce shock waves to a fluid line or system equipped with one or more flow valve according to the disclosure, caused by rapid displacement of the float member 54 and its impacting against the sealing seat 48 of the housing 22.

The valve 20 is configurable between several operative positions. At a fully open position (FIG. 2A) the float chamber 40 is drained of liquid whereby both the kinetic component and the automatic component are open, namely float 54 is displaced downwards and rests over the fluid flow regulator 100, such that sealing at the sealing ring 60 disengages from the valve sealing seat 48 and the outlet port 38 is widely open and facilitates high fluid (e.g. air or other gas) flow rate through the outlet out of the line (in case of recharging a line) or into the line (in case of a rapid drain of a line). Likewise, the automatic float 76 is displaced downwards into its open position.

Figure 4:
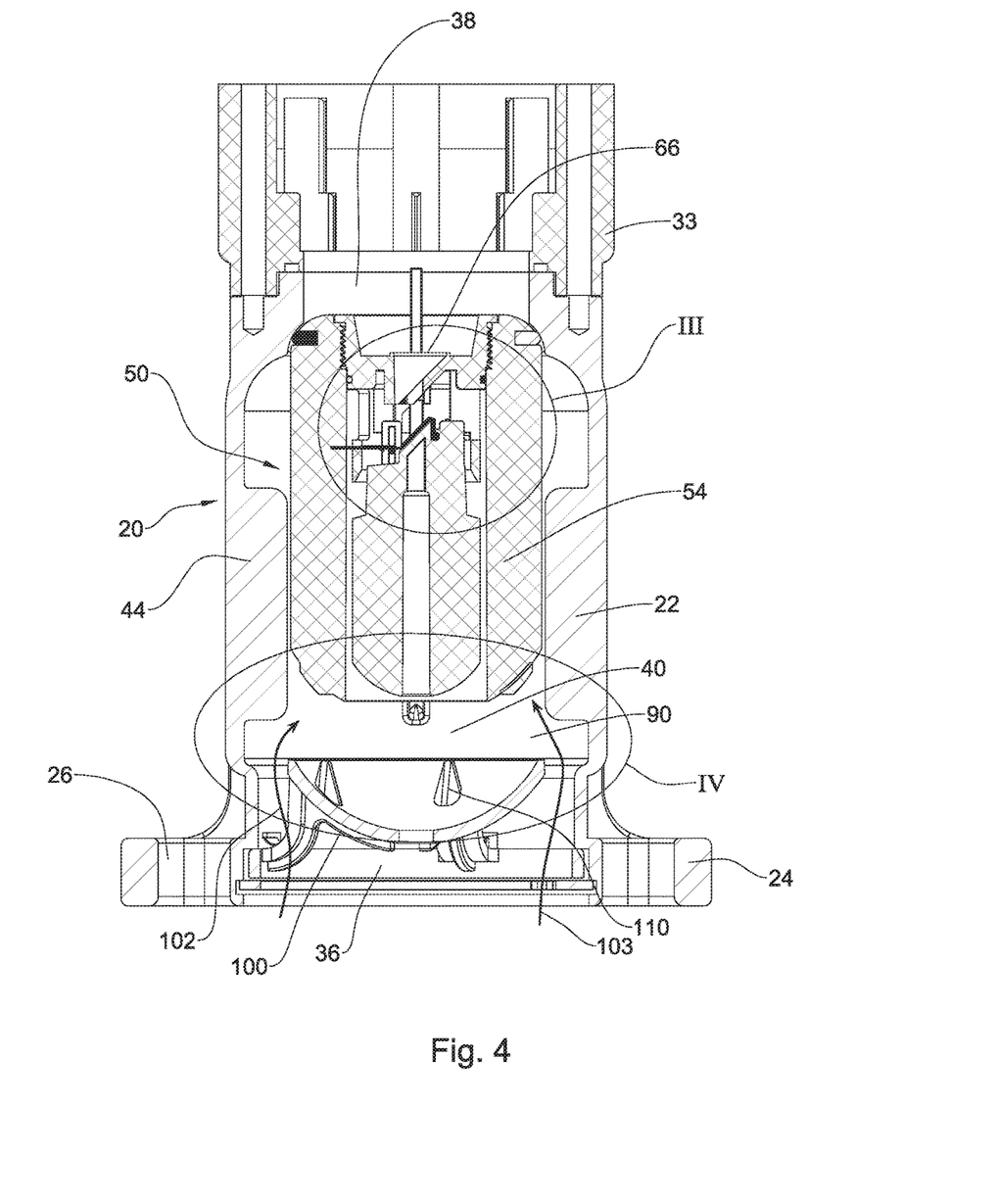
FIG. 4 is a longitudinal section of the valve of FIG. 1, the valve illustrated with the kinetic valve at a closed state and an automatic valve at an open position.

In the position of FIG. 4 the float chamber 40 is filled with liquid whereby the kinetic component is open, namely float 54 is displaced upwards into sealing engagement of the sealing ring 60 against the valve sealing seat 48, preventing liquid egress through the outlet port 38. However, the automatic valve component 58 is free to displace between an open and a closed position (illustrated open in FIG. 4), thus facilitating to automatically release to the atmosphere small pockets of air/gas as they accumulate at local high points along a pipeline when the pipeline or piping system is full and operating under pressure.

Figure 5:
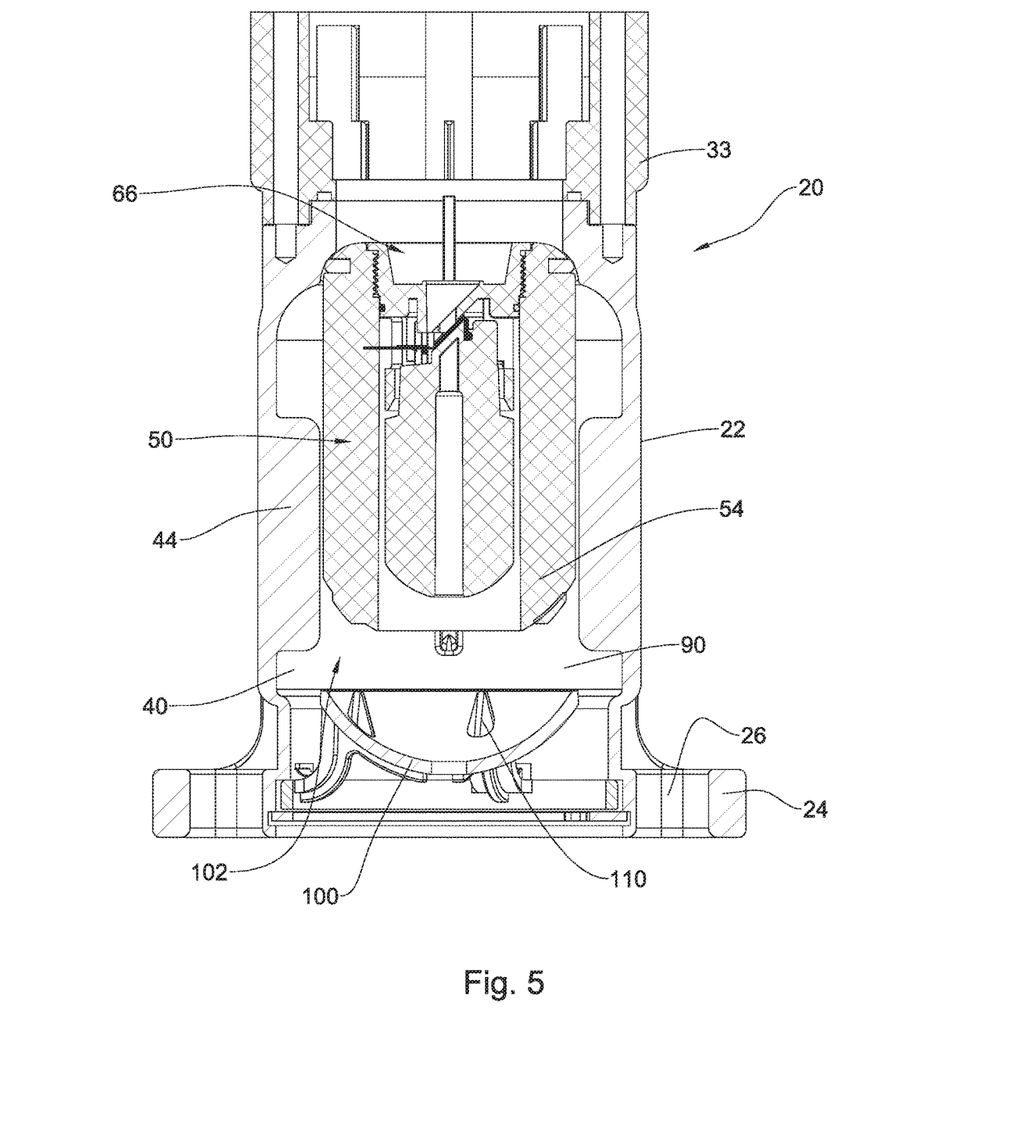
FIG. 5 is a longitudinal section of the valve of FIG. 1, the valve at a fully closed position thereof.

In FIG. 5 both the kinetic valve component 54 and the automatic valve component 58 are illustrated at their closed position, respectively, preventing any fluid flow through the valve 20.

As can further be seen in the drawings, the fluid flow regulator 100 is configured with a central aperture 103 for increasing fluid flow section area through the fluid flow regulator. However, wherein the diameter $D_{apert}$ of the aperture 103 is significantly smaller than the minimal diameter $D_{min}$ of the fluid discharge flow path.

Figure 6A:
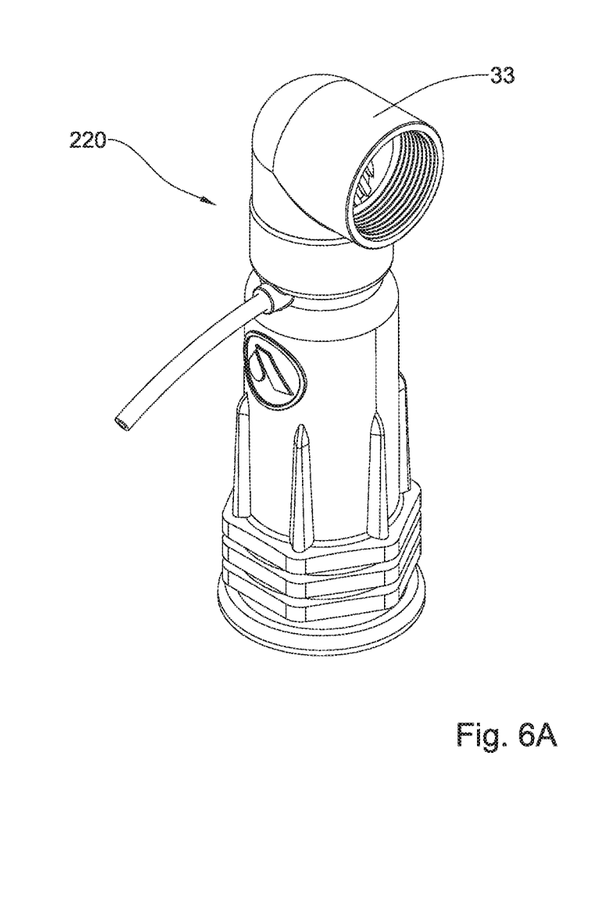
FIG. 6A is a top perspective view of a valve according to another design of the present disclosure.
Figure 6B:
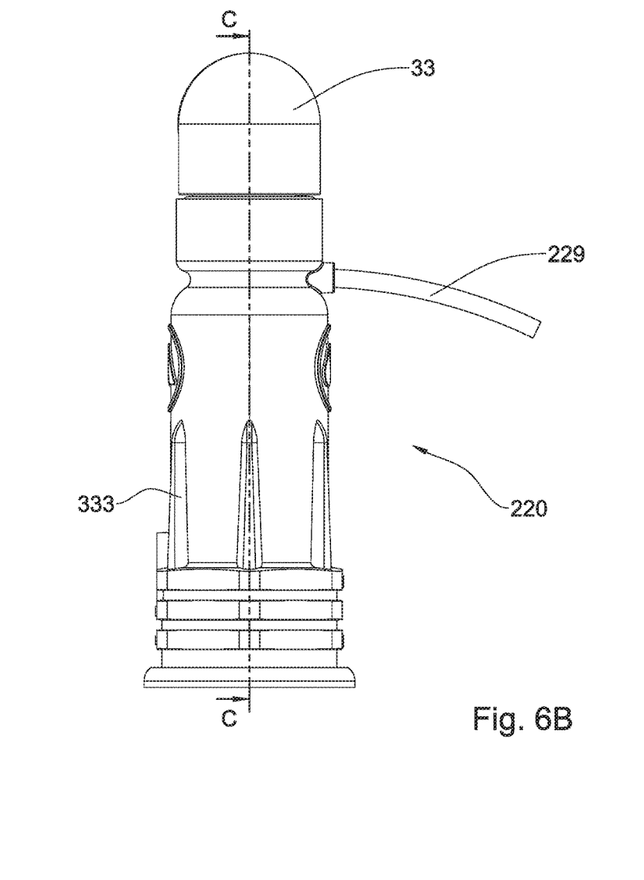
FIG. 6B is a rear view of the valve of FIG. 6A.
Figures 7A, 7B:
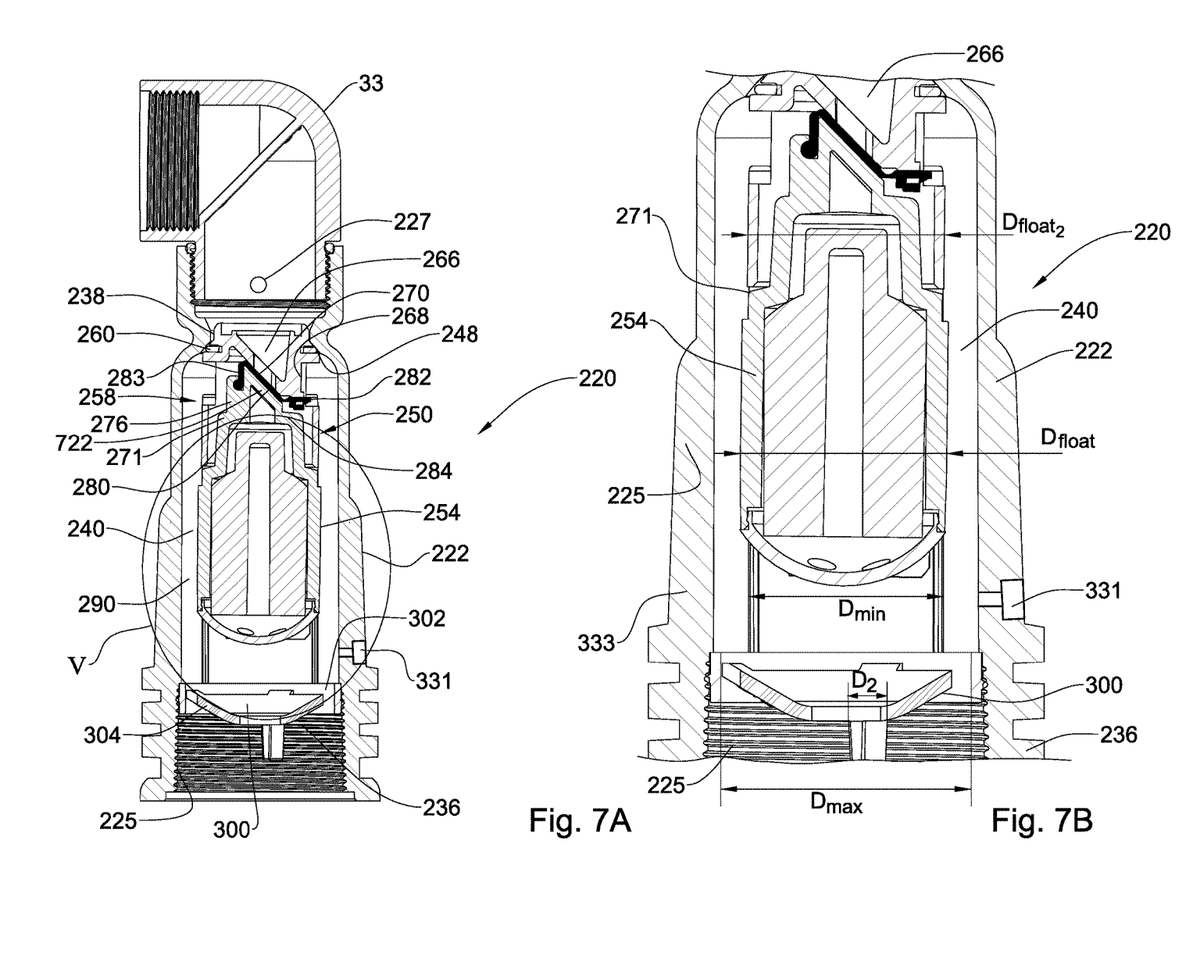
FIG. 7A is a longitudinal section of the valve of FIG. 6A, taken along line C-C in FIG. 6B, the valve at a fully open position thereof.
FIG. 7B is an enlarged view of the portion marked V in FIG. 7A.
Figure 8:
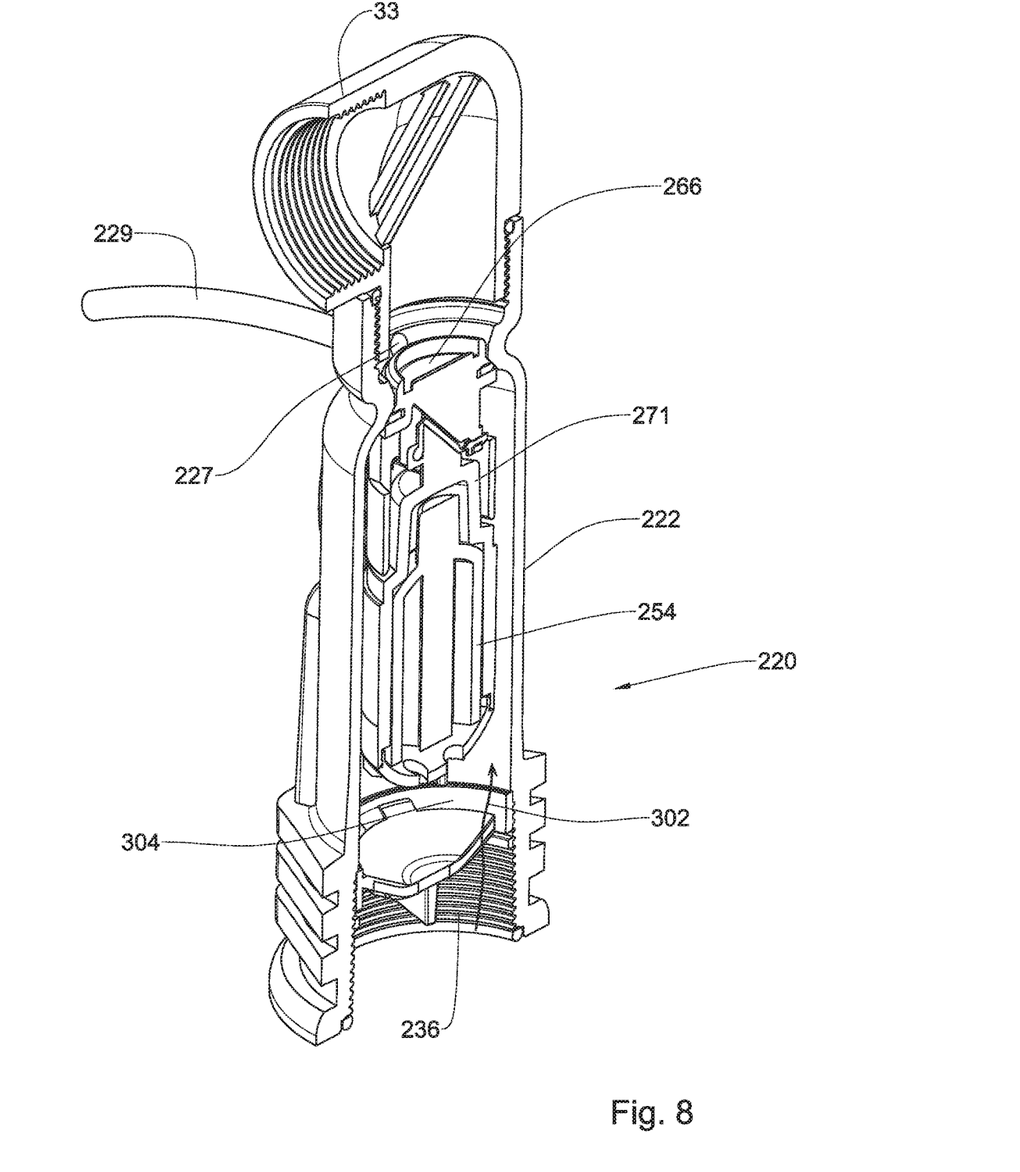
FIG. 8 is an isometric view of FIG. 7.

Turning now to FIGS. 6 to 8 of the drawings, there is illustrated a flow valve according to a modification of the disclosure, the valve generally designated 220 and wherein like elements are designated similar reference numbers as in FIGS. 1 to 5, however shifted by 200.

In the example of FIGS. 6 to 8 the valve is configured with an elongate cylindrical housing 222 configured at a bottom end thereof with an internal threaded coupling 225 for coupling the valve to a fluid line (not shown). Fitted at a top end of the housing 22 there is an inverted extension tube 33, serving as a diverter pipe so that any liquids splashed from the valve during its operation are directed side wards rather than dripping on the valve and equipment below.

The housing 222 is configured with a fluid inlet port 236 at a bottom portion thereof, and a fluid outlet port 238 at an upper portion thereof, with a float chamber 240 extending therebetween. At a top portion of the housing 22 there is an annular valve sealing seat 248, serving also for restricting axial displacement of the float member 254 at its uppermost, sealed position.

Axially displaceable within the float chamber 240 there is a float-activated valve assembly generally designated 250, being a combined-type valve assembly configured with a kinetic component in the form of kinetic float member 254, and an automatic component designated 258 mounted thereover.

The float member 254 is fitted at a top portion thereof with a sealing arrangement in the form of ring 260 (which in fact rides over a portion of the automatic valve component), and configured for sealing engagement with the annular valve sealing seat 248. However, it is appreciated that other sealing solutions are possible too such as providing a sealing ring at the sealing seat 248, etc.

Unlike the previous example, the automatic valve component 258 rides over the kinetic float member 254, and comprises an automatic fluid outlet 266 extending through a top member 268 resting over a support 271, at a top portion of the kinetic float member 254. The automatic fluid outlet 266 is configured with a substantially elongated slit-like outlet aperture 270 bounding said automatic fluid outlet aperture 270. An automatic float member 276 is located over the kinetic float member 54, and is axially displaceable there above. An elongated flexible closure membrane strip 280 is anchored at both ends thereof 282 and 283 to a top portion of said automatic float member 276 adjacent said automatic fluid outlet 270 and at a portion thereof offset with respect to said outlet, i.e. above an inclined support surface 284.

Similar to the disclosure of the earlier example, the fluid inlet port 236 is in flow communication with the float chamber 240 through a fluid inlet path 290 configured with a fluid flow regulator 300 configured with a fluid discharge flow path 302 extending through apertures 304. The fluid flow regulator 300 is similar to element 100 in the earlier example and reference is made thereto.

The arrangement is such that the minimal diameter $D_{min}$ of the fluid discharge flow path 302 (i.e. the minimal diameter of the apertures 304) is greater than the diameter $D_{float}$ of the lower portion of the kinetic float assembly 254 which in turn is greater than the diameter $D_{float2}$ of the automatic float member 276.

The through apertures 304 of the fluid flow regulator 300 constitute the fluid discharge flow path 102, said flow openings 104 having a minimal diameter $D_{min}$ and a maximal diameter $D_{max}$, wherein $D_{max} \gg D_{min}$ thereby giving rise to a significant flow-through section. The arrangement is further such that $D_{min} > D_{float}$, wherein $D_{float}$ is the diameter of at least the lower portion of the valve assembly.

According to one particular example $D_{min}$ is in the range of 0.9÷0.98 $D_{nom}$, and more particularly $D_{min} \cong 0.94 \, D_{nom}$.

In the example of FIGS. 6 to 8, the float member is composed of two body elements namely the kinetic float member 254 and the dynamic float member 271 riding thereover, wherein the diameter $D_{float}$ of a first (lowermost) body element is greater than the diameter $D_{float2}$ of a second body element articulated over the first body element, and wherein $D_{float}$ is substantially similar to the nominal diameter $D_{nom}$ of the valve. According to a particular ratio, $D_{float} \cong 0.97 \, D_{float2}$.

It is also appreciated that the fluid flow regulator 300 is retained within the fluid inlet port 236 of housing 222 by screw-coupling about the internal threaded coupling 225, thereby facilitating axial setting of the fluid flow regulator 300 with respect to the displacement of the float member, so as to control parameters of the flow path into the float chamber 240.

The valve 220 is configured at a top portion of the housing 222, above the fluid outlet port, with a drain port 227 articulated to a drain pipe 229, configured for draining residual liquids that could otherwise accumulate at an outlet chamber. This is in particular important where the valve is configured for use with potable water, to prevent water from prolonged standing and possibly contaminating (with the potential risk of flowing back into the valve through the outlet port).

More so, the housing 222 is configured with a gage port 331 extending into the float chamber 240 for articulating thereto a pressure gage and the like not shown). The gage port 331 can be canceled by the provision of a sealing plug. However it is appreciated that the valve housing can be fitted with one or more such gage ports, at different locations of the housing, or it can be devoid of any such a gage ports.

Also noticeable, the external surface of the housing 222 is configured with a plurality of longitudinal ribs 333, serving as handgrips for fastening the housing over a coupler (not shown).

It is appreciated that operation of the valve illustrated in the example of FIGS. 6 to 8 is substantially similar to that disclosed in connection with the example discussed in connection with FIGS. 1 to 5, and reference is made thereto. In FIGS. 7A, 7B and 8 the valve 220 is illustrated at its fully closed position, corresponding with the position of FIG. 4 of the earlier example, namely with both the kinetic valve component and the automatic valve component being at their closed, sealed position, respectively.

According to a modification of the disclosure, the valve can be easily converted from a combined-type valve into a single-type valve, by simple manipulation.

Figure 1A:
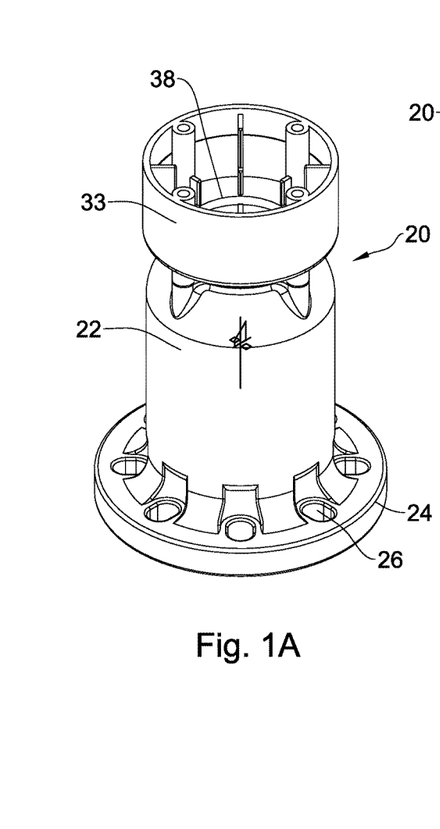
FIG. 1A is a top perspective view of a valve according to a first design of the present disclosure.
Figure 1B:
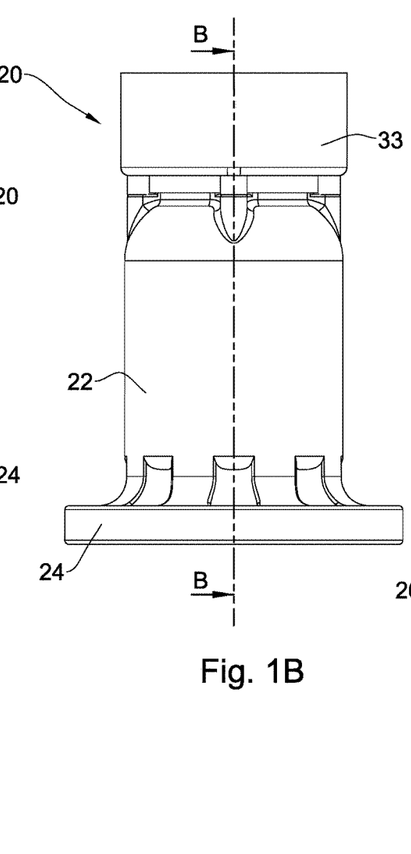
FIG. 1B is a front view of the valve of FIG. 1A.

According to a first example, the automatic component (e.g. automatic float member 58 in FIG. 1) can be removed from the kinetic float member 54 by unscrewing it and replacement thereof with a sealing plug (not shown), whereby the top opening is now sealed. By doing so the valve now acts as a kinetic valve only.

According to a second example, the kinetic component (float member 54 in FIG. 1) can be permanently biased into its uppermost position, as in FIG. 4. Such biasing can take place e.g. by a biasing spring (not shown) extending between a bottom portion of the float member 54 and a top face of the flow regulator disc 100, or by suitable upwardly extending projections (not shown) extending from the flow regulator disc 100 towards the float member, etc.), whereby the valve now acts only as an automatic valve.

The invention claimed is:

1. A gas purge valve, comprising:
   a housing configured with a float chamber extending between a fluid inlet port and a fluid outlet port, said float chamber accommodating a float-activated valve assembly axially displaceable within the float chamber;
   wherein said valve assembly comprises at least a kinetic component being axially displaceable within the housing between at least a closed position sealingly engaging a sealing seat of the fluid outlet port, and an open position in which said kinetic component is disengaged from said sealing seat;
   wherein the fluid inlet port is in flow communication with the float chamber through a fluid inlet path configured with a fluid flow regulator configured with a fluid discharge flow path; the arrangement is such that $D_{min} > D_{float}$, wherein $D_{min}$ is a minimal diameter of the fluid discharge flow path and $D_{float}$ is a diameter of at least a lower portion of the float-activated valve assembly;

wherein said fluid flow regulator is configured with a bottom face facing the fluid inlet port of the housing and having said diameter $D_{min}$.

2. The gas purge valve according to claim 1, wherein a maximal diameter $D_{max}$ of the fluid discharge flow path is substantially similar to a nominal diameter $D_{nom}$ of the gas purge valve.

3. The gas purge valve according to claim 2, wherein the diameter $D_{float}$ substantially corresponds with the nominal diameter $D_{nom}$ of the gas purge valve.

4. The gas purge valve according to claim 1, wherein the fluid flow regulator is configured with a housing engaging portion having a maximal diameter $D_{max}$ and flow openings constituting the fluid discharge flow path, said flow openings having the minimal diameter $D_{min}$, wherein the housing engaging portion is axially displaced with respect to the flow openings.

5. The gas purge valve according to claim 4, wherein the housing engaging portion extends behind the flow openings, with a plurality of legs supporting a dome shaped disc portion.

6. The gas purge valve according to claim 1, wherein the float-activated valve assembly comprises an automatic component articulately configured within or over a top portion of the kinetic component.

7. The gas purge valve according to claim 6, wherein the automatic component is configured within a receptacle configured within the kinetic component, and the automatic component and the kinetic component are axially displaceable with respect to one another.

8. The gas purge valve according to claim 1, further comprising:

wherein the kinetic component comprises a kinetic float member axially displaceable within the float chamber; and a sealing member configured for sealing engagement with the sealing seat in the closed position of the kinetic component.

9. The gas purge valve according to claim 1, wherein the kinetic component comprises a kinetic float member configured with a top portion and a sealing ring disposed at said top portion of the kinetic component, so that in the closed position of the kinetic component, said sealing ring is sealingly engaged with a corresponding shoulder constituting the sealing seat of the fluid outlet port.

10. The gas purge valve according to claim 1, wherein the fluid flow regulator is configured with one or more apertures for increasing a fluid flow section area through the fluid flow regulator such that $D_{apert} < D_{min}$, wherein $D_{apert}$ is a diameter of the one or more apertures.

11. The gas purge valve according to claim 1, wherein the float-activated valve assembly is configured with one or more drag increasing arrangements for increasing biasing of the valve assembly during its displacement into the closed position.

12. A gas purge valve according to claim 1, wherein the fluid flow regulator is configured with one or more upwardly projecting studs for supporting the kinetic component at the fully open position of the kinetic component.

13. The gas purge valve according to claim 1, wherein an outlet diameter of the gas purge valve is substantially similar to an inlet diameter thereof.

14. The gas purge valve according to claim 1, wherein the gas purge valve is configured at a top portion of the housing, above the fluid outlet port, with a drain port configured for draining residual liquids that could otherwise accumulate at an outlet chamber.

* * * * *